US006938855B2

(12) United States Patent
Marche

(10) Patent No.: US 6,938,855 B2
(45) Date of Patent: Sep. 6, 2005

(54) HOOKING STRUT OF AN ENGINE UNDER THE WING UNIT OF AN AIRCRAFT

(75) Inventor: Hervé Marche, Roqueites (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/475,766

(22) PCT Filed: Feb. 26, 2003

(86) PCT No.: PCT/FR03/00626

§ 371 (c)(1), (2), (4) Date: Oct. 22, 2003

(87) PCT Pub. No.: WO03/074359

PCT Pub. Date: Sep. 12, 2003

(65) Prior Publication Data

US 2004/0129832 A1 Jul. 8, 2004

(30) Foreign Application Priority Data

Mar. 4, 2002 (FR) ............................................ 02 02698

(51) Int. Cl.[7] ................................................ B64D 27/00

(52) U.S. Cl. ......................... 244/54; 248/554; 248/555; 248/556; 244/53 R; 244/55

(58) Field of Search ........................... 244/54–55, 53 R; 249/54, 53 R, 55; 248/554–557; 60/39.31

(56) References Cited

U.S. PATENT DOCUMENTS

| | | | | |
|---|---|---|---|---|
| 3,831,888 A | | 8/1974 | Baker et al. | 244/54 |
| 3,844,115 A | * | 10/1974 | Freid | 248/554 |
| 4,560,122 A | | 12/1985 | Parkinson et al. | 244/54 |
| 5,054,715 A | * | 10/1991 | Hager et al. | 244/54 |
| 5,092,538 A | * | 3/1992 | Denney | 244/54 |
| 5,303,896 A | * | 4/1994 | Sterka | 244/54 |
| 5,347,884 A | * | 9/1994 | Garnjost et al. | 248/554 |
| 5,467,941 A | * | 11/1995 | Chee | 244/54 |
| 5,746,391 A | * | 5/1998 | Rodgers et al. | 244/54 |
| 5,806,792 A | | 9/1998 | Brossier et al. | 244/54 |
| 6,095,456 A | * | 8/2000 | Powell | 244/54 |
| 6,126,110 A | * | 10/2000 | Seaquist et al. | 244/54 |
| 6,708,925 B2 | * | 3/2004 | Udall | 244/54 |

FOREIGN PATENT DOCUMENTS

| | | | |
|---|---|---|---|
| EP | 0 437 868 A1 | 1/1990 | B64D/29/06 |

* cited by examiner

*Primary Examiner*—Michael J. Carone
*Assistant Examiner*—L. Semunegus
(74) *Attorney, Agent, or Firm*—Thelen Reid & Priest LLP

(57) ABSTRACT

A strut (10) for hooking an engine (16) under a wing body assembly (12) of an aircraft comprises a rigid structure as well as a mechanism for hooking this structure under the wing body assembly. This mechanism comprises a front fastener (22), a rear fastener (24) and a structure (26) for absorbing thrust. To install an engine (16) of greater diameter under the wing body assembly (12) of an existing plane, the rear part **(20*b*) of the strut (10) is given a width which increases as it progresses to the rear. Furthermore, the rear fastener (24)** comprises two braces which are fixed on both sides of the rigid structure and two shackles which connect each of the braces to an additional transverse rib integrated into the wing body assembly.

13 Claims, 7 Drawing Sheets

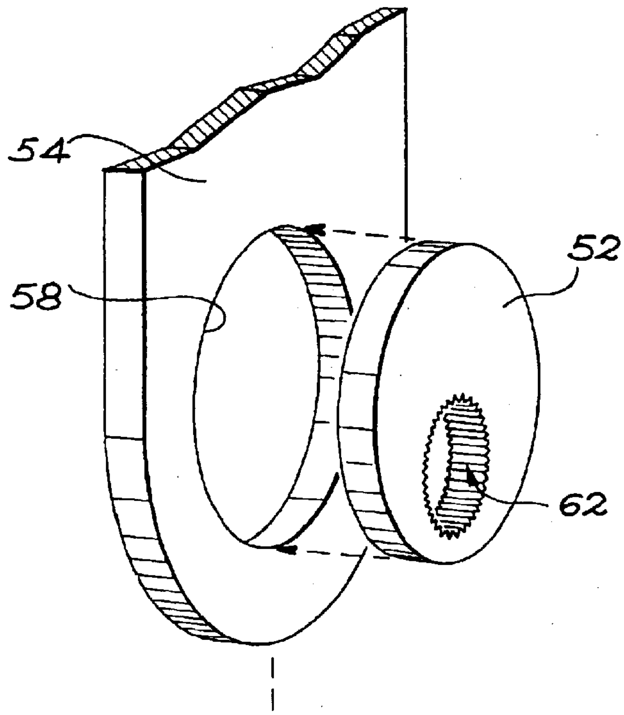
FIG. 6
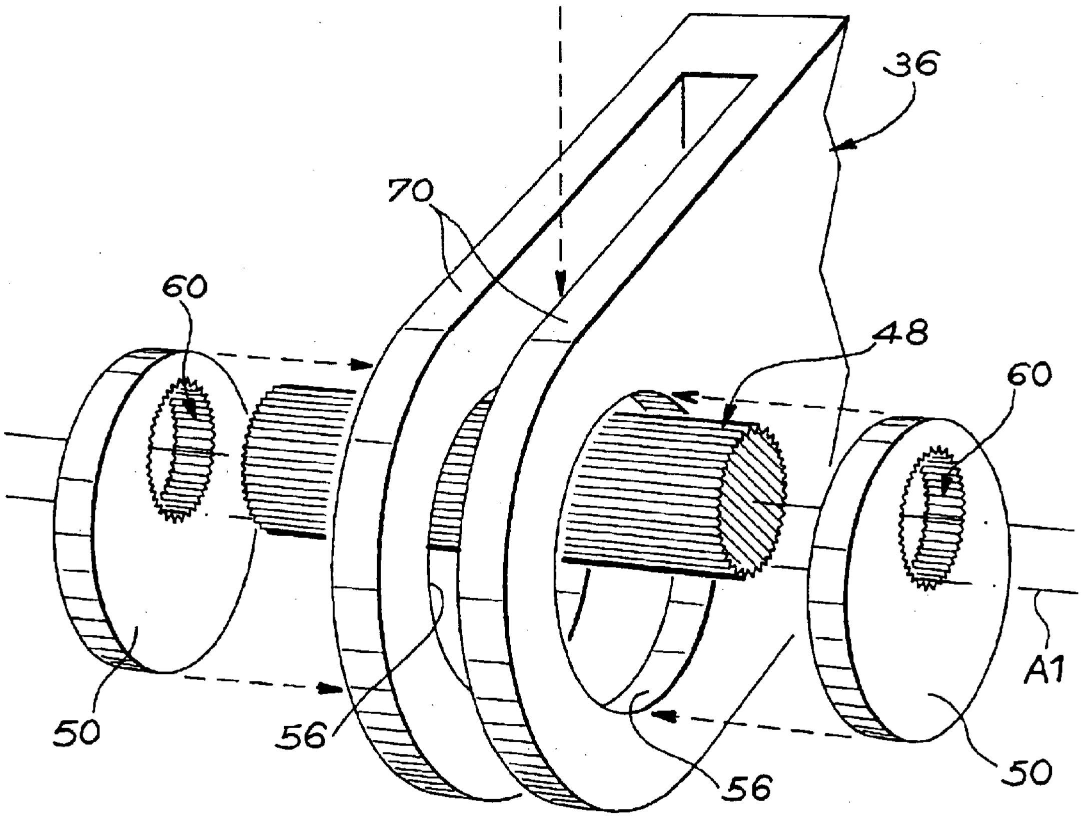

HOOKING STRUT OF AN ENGINE UNDER THE WING UNIT OF AN AIRCRAFT

CROSS-REFERENCE TO RELATED APPLICATIONS

This application claims priority on International Patent Application No. PCT/FR03/00626 entitled "Hooking Strut of an Engine Under the Wing Unit of an Aircraft" by Herve MARCHE, which claims priority of French application no. 02 02698, filed on Mar. 4, 2002 and which was not published in English.

DESCRIPTION

1. Technical Domain

The invention relates to a strut for ensuring hooking or suspension of an engine under a wing body assembly of an aircraft. More precisely, the invention relates to a strut of structure original, as well as the device by which the strut is suspended on the wing body assembly.

Such a device can be utilised on any type of aircraft comprising engines suspended under the wing body assembly by way of struts. It is particularly adapted to planes equipped with engines whose diameter is substantial relative to the space available under the wing body assembly when the plane is on the ground.

2. Prior Art

In existing planes, the engines are suspended under the wing body assembly by complex structures, called "struts".

These structures are especially well known for transmitting to the wing body assembly static and dynamic forces generated by engines (weight, thrust, aerodynamic force, etc,).

In existing aircraft, the structure of the struts is generally of the "caisson" type, that is, it is formed by the assembly of lower and upper longerons interconnected by a certain number of ribs. So as not to affect the aerodynamic flow of air in the minimal-height space which separates the engines from the wing body assembly, it is usual to give the struts the smallest width as possible and to keep this width constant over the whole length of the strut, from its front end to its back end.

The transmission of these forces between the strut and the wing body assembly is usually ensured by a front fastener, a rear fastener and an intermediate absorbing of forces.

The front fastener comprises two groups of shackles placed respectively vertically at each side of the strut. Each group of shackles attaches a double-headed brace integral with the upper longerons of the strut to a double-headed brace integral with a front longeron of the wing body assembly. The linkages between the two groups of shackles and the braces are ensured by double axes, oriented in a transverse direction relative to the plane, that is, in a direction orthogonal both to the vertical and to the longitudinal axis of the plane.

The rear fastener comprises two pairs of triangular shackles placed in a vertical plane oriented to a transverse direction relative to the plane. These two pairs of shackles connect a double brace solid with the upper rear longeron of the strut to a brace solid with an intermediate longeron of the wing body assembly. The linkages between the two pairs of shackles and braces are ensured by pot-type joints whereof the axes are oriented in a longitudinal direction relative to the plane.

The intermediate starting point of the forces is realised by a pot-type joint with a vertical axis, fixed in the upper rear longeron of the strut, and by a shearing pion fixed under the wing body assembly, so as to protrude vertically into the pot-type joint.

In this classic arrangement the longitudinal forces (thrust, inverters) are transmitted via the intermediate starting point of the forces. The transverse forces are distributed between this very intermediate point and the rear fastener. The forces following the vertical direction pass through the front and rear fasteners. The moment along the longitudinal axis is taken up by the front fastener. The moment along the transverse axis is taken up the in vertical direction by the assembly made up of the front and rear fasteners. Finally, the moment along the vertical axis is taken up in the transverse direction by the assembly made up of the intermediate point and the rear fastener.

On existing aircraft, this arrangement enables the static and dynamic forces engendered by the engine to be transmitted to the wing body assembly under normal flight conditions as under extreme conditions.

Nevertheless, it is a disadvantage to have significant bulkiness in a vertical direction, due to the fact of the presence of shackles connecting braces which protrude upwards above the strut and downwards under the wing body assembly.

This disadvantage can be prejudicial if the decision is made to equip an existing plane with more powerful engines, so as to increase its pay load at takeoff and/or to decrease its fuel consumption. In effect, more powerful engines or engines with reduced consumption generally have a larger diameter. Considering the space requirement of existing struts in the vertical direction, especially at the level of the devices ensuring they are hooked ob beneath the wing body assembly, it seems that implantation of engines of larger diameter is very limited due to the decrease in ground clearance of the engines when the aircraft is landed.

Another problem concerns the increase in forces which must be transmitted to the wing body assembly via the strut, on account of the increased power and the size of the engines.

To ensure transmission of the forces under required safety conditions the structure of the strut and its fasteners would then have to be resized to take into account the increase in forces to be transmitted. This would lead to an additional increase in the bulk of the plane, counteracting the desired aim.

EXPLANATION OF THE INVENTION

The precise object of the invention is to propose a strut having an original structure for using a novel device for hooking the strut underneath the wing body assembly for supporting a heavier engine of greater diameter, while maintaining adequate ground clearance and transmitting via each of the elements of the hooking device loads which remain acceptable relative to those which are transmitted via the hooking devices equipping existing struts.

The object of the invention also is to propose an original strut whereof the hooking device implants on the existing plane a heavier engine and of greater diameter, by reducing to a minimum the modifications made to the wing body assembly of the plane.

According to the present invention, these different objects are attained, at least in part, due to use of a strut for hooking an engine under a wing body assembly of an aircraft, comprising a rigid structure and means of hooking said structure under the wing body assembly, said hooking means comprising a front fastener, a rear fastener and means of absorbing forces, characterised in that the rigid structure comprises a rear part having a width which increases substantially as it progresses to the rear, with the rear fastener comprising two rear braces fixed on the rigid Structure, so as to protrude laterally on both sides of the latter, in a rear region of said rear part, and at least two joining elements each connecting one of said rear braces to a structural part of the wing body assembly.

In this arrangement, progressive widening of the strut in its rear part and mounting in the rear fastener of the joining elements, serving especially to recover a portion of the forces transmitted in the vertical direction as well as the moment along the longitudinal axis, effectively and substantially increasing the distance between said joining elements relative to the prior art. As a consequence, it becomes possible to transfer much more significant forces without substantially increasing the size of the fasteners. Heavier and more powerful engines can thus be installed under the wing body assembly of existing planes.

In addition, the vertical space requirement of the strut can be reduced, enabling installation of engines of greater diameter while acceptable ground clearance is maintained.

In a first preferred embodiment of the invention, which favours a reduction in the vertical space requirement of the strut, each of the joining elements comprises a first hinge pin, a brace passing through a lower wing surface covering of the wing body assembly and a second hinge pin parallel to the first, the first hinge pin connecting one of the rear braces to an inner end of the brace and the second hinge pin connecting an upper end of the shackle to the structural part of the wing body assembly.

In this case, the two hinge pins are preferably oriented in a direction longitudinal to the engine.

According to a second preferred embodiment of the invention each of the joining elements comprises a hinge pin, at least a first piece mounted in one of the rear braces so that it can pivot about a first axis and a second piece mounted in a support fixed to the structural part of the wing body assembly, under a lower wing surface covering of the latter, such that it can pivot about a second axis, the hinge pin passing through the first piece and the second piece, the first axis and the second axis being parallel to one another, offset vertically one relative to the other and oriented in a longitudinal direction of the engine.

Relative to the preceding, this second embodiment of the invention effectively eliminates any recess in the lower wing surface covering of the wing body assembly. Therefore, the increase in the complexity and the cost of the wing body assembly, the problems of tightness of the fuel tank integrated into the wing body assembly and the decreases in capacity of this tank which flow from the presence of relief in the lower wing surface covering of the wing body assembly are eliminated.

In the second embodiment of the invention, anti-rotation means are advantageously provided between the hinge pin and each of the first and second pieces, so as to prohibit relative rotation between them.

Preferably, according to a refinement of the second embodiment of the invention, each of the rear braces is a V-shaped cap comprising two parallel plates between which is located said support, a first piece being mounted in each of the plates of the rear brace.

Advantageously, two first pieces are mounted respectively in each of the two plates of each rear brace, said first pieces cooperating with the two plates of the rear brace via surfaces in the form of segments of spheres defining a linkage of pot-type joint type between the plates and said pieces.

In this case, intermediate pieces forming cages of pot-type joint can be fixed in each of the two plates of the rear brace. These intermediate pieces cooperate via internal surfaces in the form of segments of spheres with external surfaces in the form of segments of spheres of the first pieces.

In an embodiment of the invention, relative to the aircraft taken as a whole, one of the joining elements, referred to as "internal", is closer to the fuselage than the other joining element, referred to as "external". Advantageously, the external joining element is then closer than the internal joining element of a vertical plane passing through a longitudinal axis of the engine.

In a preferred embodiment, the means for absorbing forces advantageously comprise a trunnion fixed to the rear part of the rigid structure, between the two braces, and a shearing pion, fixed to the wing body assembly and passing through said trunnion.

In this case, the shearing pion is preferably fixed to the structural part of the wing body assembly and located in a vertical plane passing through a longitudinal axis of the engine.

Advantageously, the front fastener comprises a front brace fixed to a front region of said rear part, and a mounting axle of said front brace on the wing body assembly, said mounting axle being oriented according to a longitudinal direction.

In this case, the mounting axle is preferably fixed to a front longeron of the wing body assembly.

BRIEF DESCRIPTION OF DIAGRAMS

Two preferred embodiments of the invention will now be described by way of non-limiting examples, with reference to the attached diagrams, in which:

FIG. 6 is an exploded perspective view which illustrates a refinement of the second embodiment of the rear fastener according to the present invention.

DETAILED DESCRIPTION OF PREFERRED EMBODIMENTS OF THE INVENTION

Figure 1:
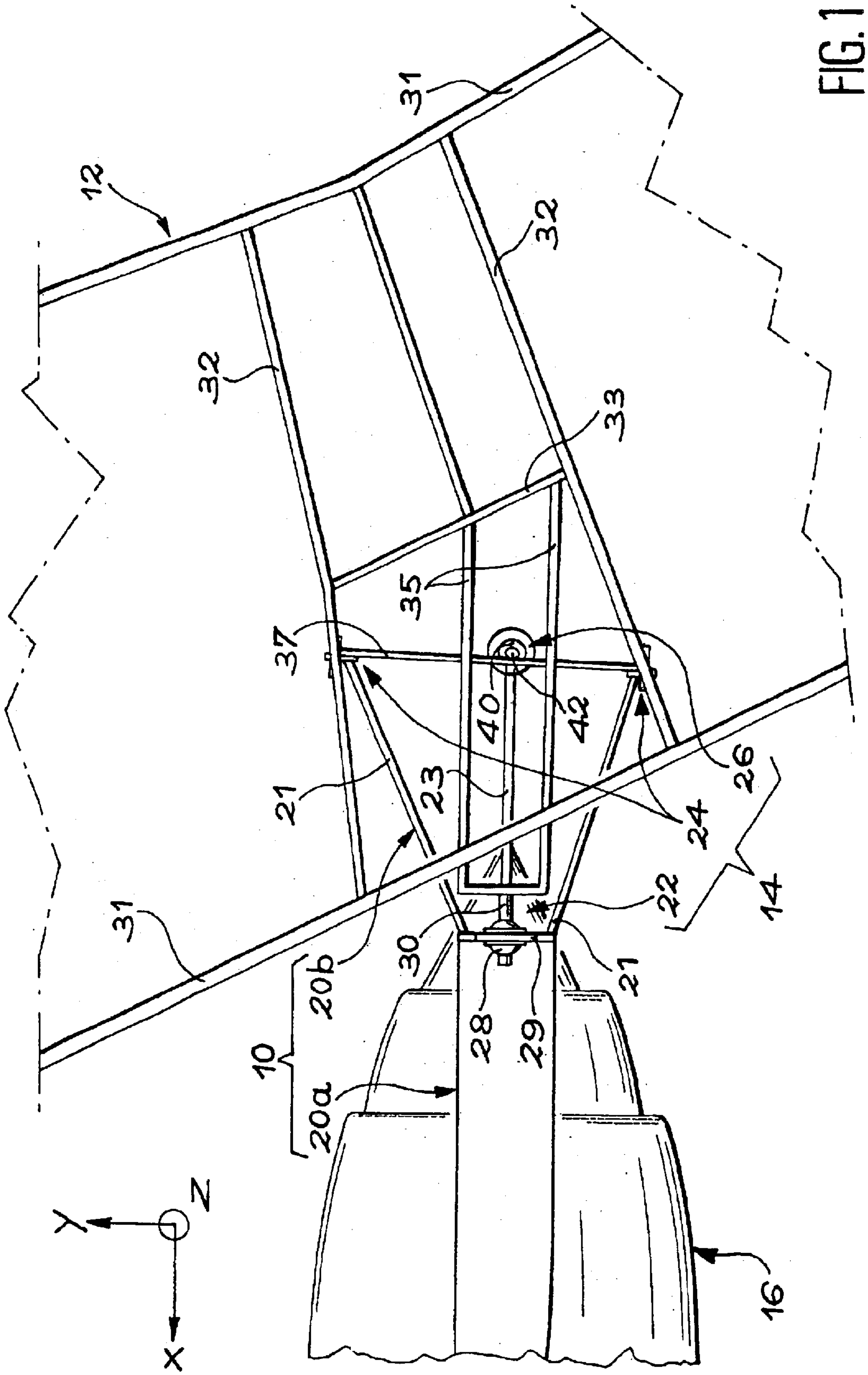
FIG. 1 is a plan view diagrammatically showing the rigid structure of a strut according to the present invention, hooked on under a wing of a plane whereof the walls have been deliberately omitted.

By convention, X is a direction corresponding to the longitudinal axis of the engine or the aircraft, Y is a direction oriented transversely relative to the aircraft and Z is the vertical direction, these three directions being orthogonal to one another. In the figures, the reference numeral 14 generally designates a hooking strut made according to the present invention. This strut 10 is mounted under a wing body assembly 12 of an aircraft by first hooking means 14. An engine 16 is suspended on the strut 10 by second hooking means (not illustrated here.

As illustrated more precisely in FIG. 1, the rigid structure of the strut 10 comprises a front part 20*a* of substantially constant width and a rear part 20*b* of which the width increases substantially and progressively, towards the rear. In this way, the width of the rear part 20*b* changes from a value substantially equal to that of the front part inn its front region to a value at least double that in its rear region.

The front part 20*a* of the strut 10 is situated essentially above the engine 16 and the rear part 20*b* is situated essentially under the wing body assembly 12.

The rigid structure of the strut 10 is formed conventionally by an assembly of longerons and ribs, arranged to ensure transmission of the forces between the engine 16 and the wing body assembly 12 successively via second hooking means (not illustrated) and first hooking means 14. This arrangement of longerons and ribs is made by the expert from his existing knowledge. It is not part of the invention and there will be no detailed description made thereof.

For good comprehension of the description of the first hooking means 14, it is simply specified that, in the illustrated embodiment, the rear part 20*b* of the rigid structure of the strut 10 comprises two lateral longerons 21, a central longeron 23, a front rib 25 and a rear rib 27. The lateral longerons 21 form the lateral walls of the rear part 24*b*. The longeron central 23 is situated in the vertical plane XZ passing through the longitudinal axis of the engine 16. Finally, the front ribs 25 and rear ribs 27 are situated in transverse planes YZ respectively at the junction with the front part 20*a* and behind the strut 10.

The rear part 20*b* of the rigid structure of the strut 10 also comprises an upper horizontal longeron, in the form of a plate, which is not illustrated in the figures for the sake of clarity. For the same reason the outer envelope of the strut is not illustrated in the figures either.

By way of comparison, only the internal structure of the wing body assembly 12 is illustrated in the figures, that is, the coating of the latter has been omitted deliberately. Therefore, in the part of the wing body assembly 12 supporting the engine 10, it is evident that this internal structure comprises front and rear longerons 31, two longitudinal ribs 32 interconnecting the front and rear longerons 31, a transverse rib 33 interconnecting the longitudinal ribs 32, parallel to the longerons 31, two intermediate ribs 35 connecting the front longeron 31 to the transverse rib 33, in a plane XZ and an intermediate transverse rib 37 interconnecting the two intermediate ribs 35, in a plane XZ. Added to these usual components of the internal structure of the wing body assembly are two additional ribs connecting the intermediate ribs 35 to the longitudinal ribs 32 in the plane YZ containing the intermediate transverse rib 37. For the sake of clarity, the intermediate transverse rib 37 and these two supplementary ribs are designated by the same reference numeral 37.

The first hooking means 14 comprise a front fastener 22, a rear fastener 24 and means 26 for absorbing forces.

Figure 3:
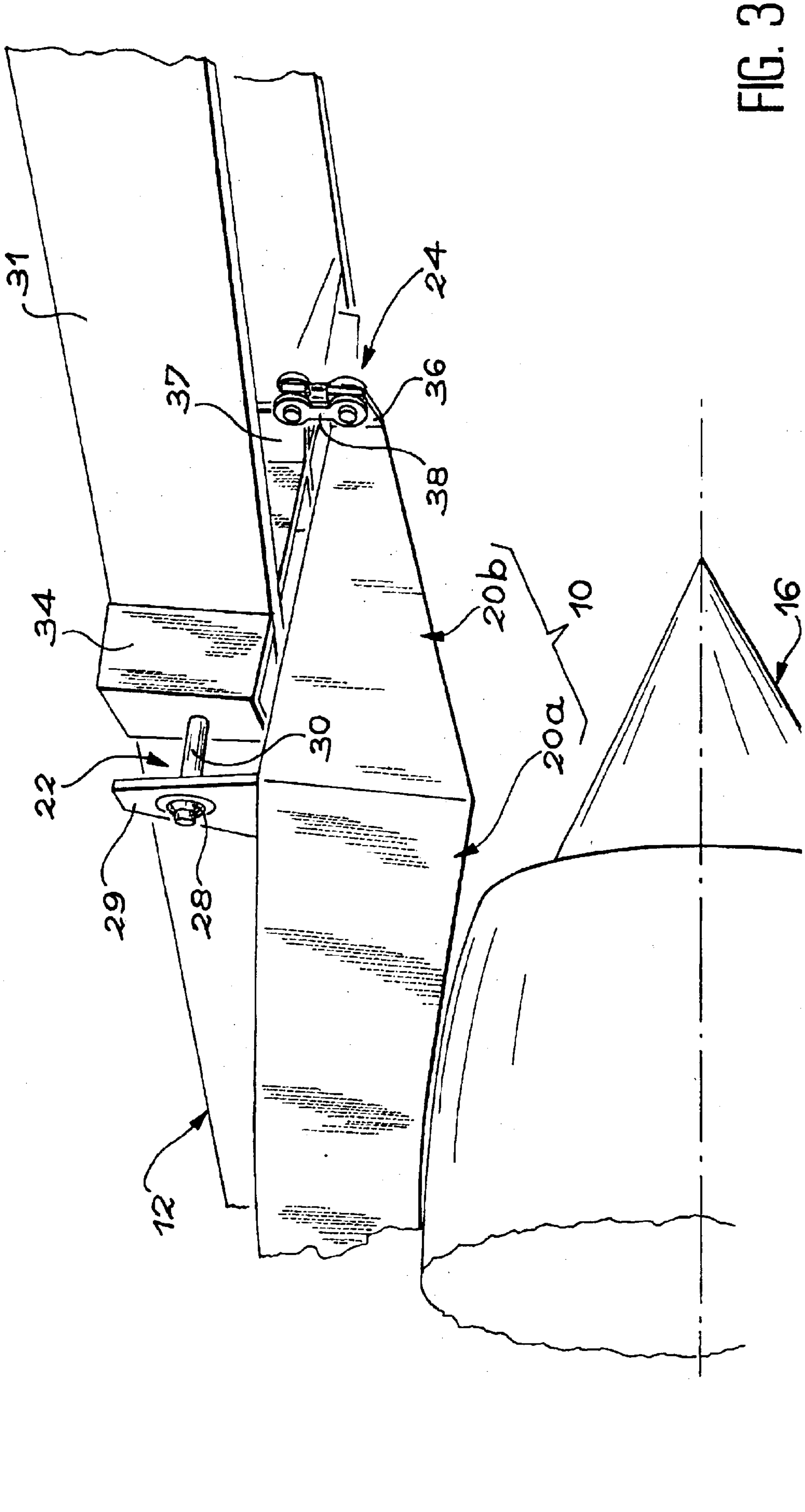
FIG. 3 is a front three quarter perspective view which illustrates the front fastener interposed between the wing body assembly and the front region of the rear part of the strut.

In the embodiment illustrated in FIGS. 1 and 3, the front fastener 22 comprises a front brace 29 located in the extension of the front rib 25 of the strut 10 and integral with said brace. More precisely, the front brace 29 protrudes upwards in a plane YZ, from a front region of the rear part 20*b* of the strut 10. It supports a pot-type joint 28 whose axis is oriented in the longitudinal direction X.

The front fastener 22 also comprises a mounting axle 30, which is fixed to the front longeron 31 of the wing body assembly 12. More precisely, the mounting axle 30 is fixed to the front face of the front longeron 31 of the wing, by means of a console 34, so as to protrude towards the front in the longitudinal direction X. The mounting axle 30 passes through the pot-type joint 28 without clearance, carried by the brace 29, so as to especially ensure transmission, between the strut 10 and the wing body assembly 12, forces oriented in the vertical direction Z and in the transverse direction Y.

It should be noted that the front fastener 22 is integrated inside the coating (not shown) of the wing body assembly, such that the lower part of the brace 29 traverses the lower wing surface region of the latter. Sealing elements such as lip seals are advantageously provided to close the interstice thus arranged between the brace 30 and the covering of the wing body assembly.

This arrangement of the front fastener 22 places the strut 10 vertically close to the wing body assembly 12, benefiting installation of an engine 16 of greater diameter.

Figure 4:
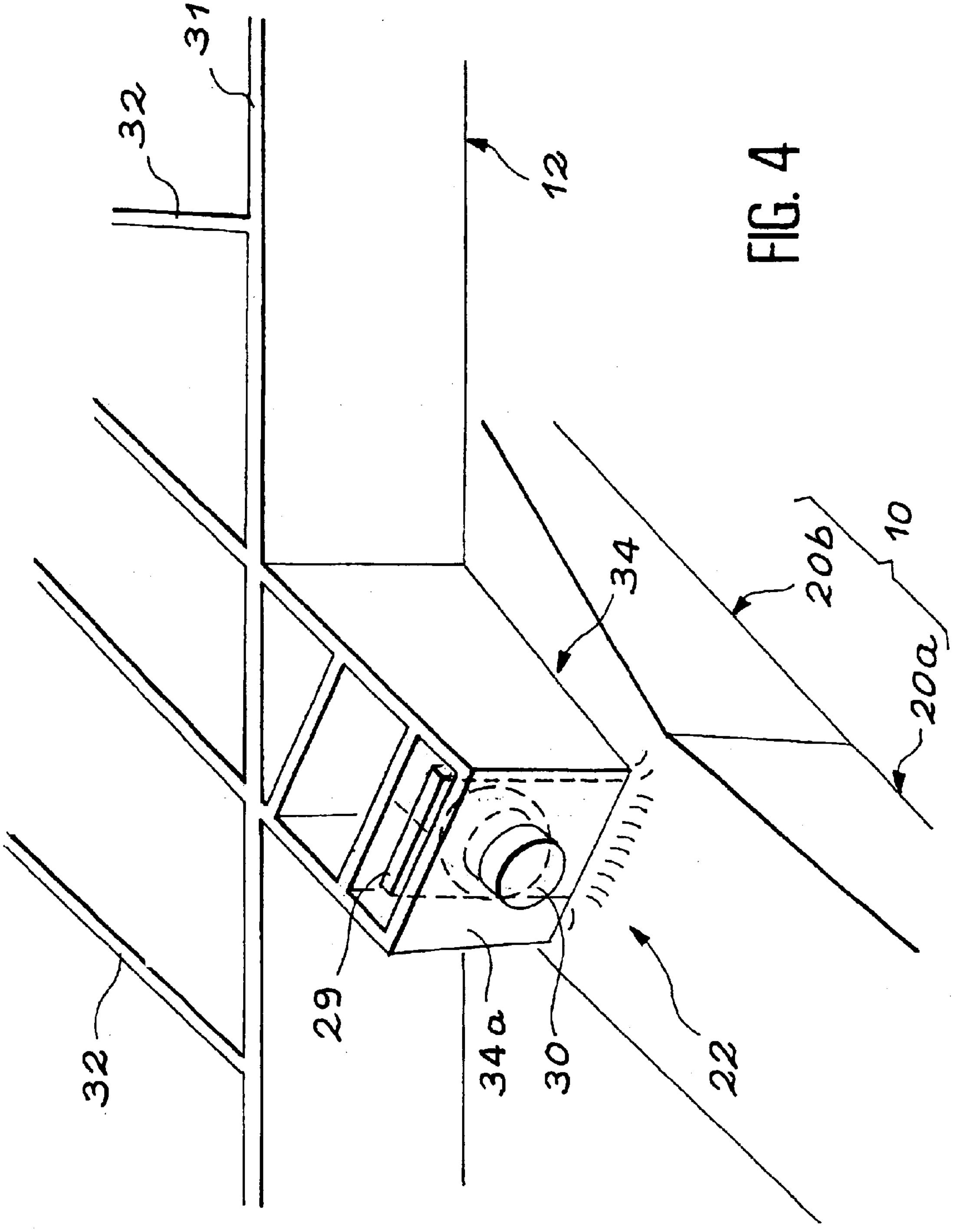
FIG. 4 is a front three quarter perspective view, taken from above, and illustrates a variant of the front fastener.

In the embodiment variant shown in FIG. 4, the console 34 comprises a part 34*a* located in front of the brace 29, so as to support the axis 30 on both sides of the pot-type joint 28. The rear fastener 24 comprises two rear braces 36 fixed, for example, by screw-bolt connection, on both sides of the strut 10, in a rear region of the rear part 20*b*. The rear braces 36 can especially by fixed on the upper horizontal longeron (not shown) which interconnects the ribs 21, 23, 25 and 27. More precisely, the rear braces 36 protrude on both sides of the strut 10 in the transverse direction X, in the immediate proximity of the upper face of the strut and in extension of the rear rib 27 of the rigid structure of the strut.

Further to the rear brace 36, each of the rear fasteners 24 comprises a joining element which connects each of the rear braces 36 to a structural part of the wing body assembly 12, constituted in this case by the intermediate transverse rib 37. A first embodiment of this joining element will be described with reference to FIGS. 2 and 3.

In this first embodiment, the sealing element of each rear fastener 24 comprises a shackle 38, preferably double, which connects the brace 36 to the wing body assembly 12. More precisely, each of the shackles 38 is oriented substantially in the vertical direction Z and connects one of the rear braces 36 to the intermediate transverse rib 37, in the vicinity of the longitudinal ribs 32. The shackles 38 are located in the same plane YZ and are articulated respectively on the braces 36 and on the rib 37 by first hinge pins 44 and by the second hinge pins 46 oriented in the longitudinal direction X of the engine.

With the hinge pins 44 and 46 by which it is articulated to the braces 36 and to the rib 37, each of the shackles 38 constitutes one of the abovementioned sealing elements.

As a variant, the braces 36 and the shackles 38 can also be located in planes XZ parallel to one another.

This arrangement allows the rear fastener 24 to transmit to the wing body assembly 12 a portion of the forces originating from the engine 16, oriented in the vertical direction Z.

It should be noted that the shackles 38 pass through the lower wing surface covering of the wing body assembly 12, to then hinge on the transverse intermediate rib 37. Sealing elements such as lip seals are advantageously provided to close the interstice thus arranged between the shackles and the envelope of the wing body assembly.

This arrangement of the rear fastener 24 allows the strut 10 to be placed vertically close to the wing body assembly 12, which benefits the installation of an engine 16 of greater diameter.

Figure 2:
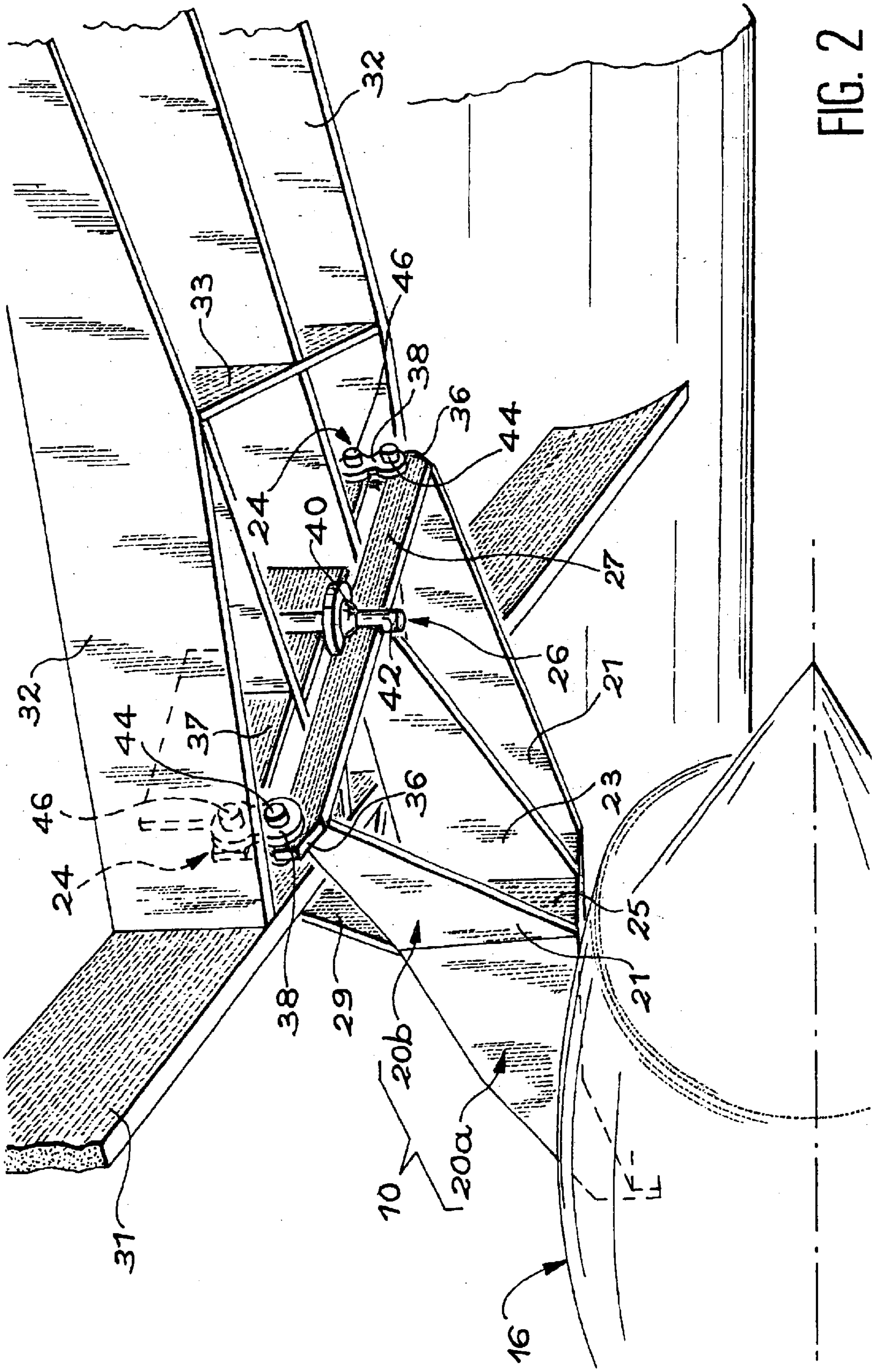
FIG. 2 is a three quarter rear perspective view which illustrates especially the rear fastener and the means for absorbing forces interposed between the wing body assembly and the rear region of the rear part of the strut, according to a first embodiment of the invention.

As also shown in FIGS. 1 and 2, in the illustrated embodiment, the means 26 for absorbing forces comprises a pot-type joint 40, fixed to the strut 10, as well as a shearing pion 42 fixed to the wing body assembly 12.

More precisely, the pot-type joint 40 is fixed to the upper horizontal longeron (not shown) which interconnects the ribs 21, 23, 25 and 27 realising the rigid structure of the strut 10, in a vertical plane XZ passing through the longitudinal axis of the engine 16. The shearing pion 42 is fixed to the transverse intermediate rib 37 of the wing body assembly and protrudes downwards in the vertical direction Z. Finally, the pot-type joint 40 is traversed by a bore oriented in the vertical direction Z and in which the shearing pion 42 is received without play.

This arrangement allows the means 26 for absorbing forces to transmit to the wing body assembly 12 a portion of the forces originating from the engine 16 and oriented in directions X and Y.

As is shown in FIG. 1 in particular, the two joining elements of the rear fastener 24 are arranged preferably dissymetrically relative to the vertical plane XZ passing through the longitudinal axis of the engine 16 and through the means 26 for absorbing forces. More precisely, the distance separating this vertical plane XZ from the external joining element relative to the aircraft (downwards in FIG. 1) is less than the distance separating the vertical plane XZ from the internal joining element relative to the aircraft (upwards in FIG. 1).

In summary, in the arrangement which has just been described by way of example with reference to FIGS. 1 to 3, the forces exerted by the engine 16 in the longitudinal direction X are transmitted to the wing body assembly 12 by the means 26 of thrust, and the forces exerted by the engine 16 in the transverse direction Y are transmitted to the wing body assembly 12 conjointly by the thrust means 26 and by the front fastener 22 and the forces exerted by the engine 16 in the vertical direction Z are transmitted to the wing body assembly 12 conjointly by the front and rear fasteners 22 and 24.

In addition, the moment according to the longitudinal axis X is taken up by the rear fastener 24 in the form of two forces oriented in the opposite directions along the vertical axis Z, the moment according to the transverse axis Y is taken up conjointly by the front fasteners 22 and rear fasteners 24 in the form of forces exerted along the vertical axis Z, and the moment along the vertical axis Z is taken up by the assembly of means 26 for absorbing forces, front fastener 22, in the form of forces oriented in the transverse direction Y.

Therefore, an increase of around a third of the mass of the engine would be translated in average by a slight decrease in loads transmitted by each of the elements of the hooking device, under normal flight conditions.

On the other hand, in spite of the increase in diameter accompanying the increase in mass of the engine, the abovedescribed arrangement helps to maintain acceptable ground clearance without having to resort to significant modifications to the wing body assembly.

In the first embodiment of the invention, which has just been described with reference to FIGS. 1 to 3, the rear fastener 24 comprises two joining elements, whereof each comprises a shackle of which the upper part is lodged in a recess formed in the wing body assembly and which passes through the lower wing surface covering of the latter. The consequence of this arrangement is an increase in the complexity and cost of the wing body assembly, the occurrence of sealing problems of the fuel tank integrated into the wing body assembly and a decrease in the capacity of this tank.

These drawbacks are eliminated in the second embodiment of the invention which will be described with reference to FIG. 5.

In this second embodiment of the invention, the shackles are eliminated and each of the joining elements comprises a single hinge pin 48, a first piece 50 in the form of a disc and a second piece 52 in the form of a disc, generally identical to the first.

More precisely, the first piece 50 in the form of a disc is mounted in a cylindrical hole 56 passing through one of the rear braces 36 along a first axis A1 oriented in a longitudinal direction of the engine, such that the first piece 50 can turn freely about this first axis.

Comparably, the second piece 52 in the form of a disc is arranged in a cylindrical hole 58 which passes through a foot providing the support 54 along a second axis A2 oriented in a longitudinal direction of the engine, such that the second piece 52 can pivot freely about this second axis. More precisely, the foot providing the support 54 is fixed to the structural part of the wing body assembly and protrudes downwards under the lower wing surface covering of the latter, without there being any opening or crack in this coating. The second axis A2 is parallel to the first axis A1. In addition, the second axis A2 is offset vertically upwards relative to the first axis A1 by a distance D which can be slightly greater, substantially equal or even lass than the diameter of the hinge pin 48.

The hinge pin 48 has a diameter substantially less than that of the pieces 50 and 52. It passes through cylindrical holes 60 and 62 machined respectively in the first piece 50 in the form of a disc and in the second piece 52 in the form of a disc. More precisely, the axis A3 common to the cylindrical holes 60 and 62 and to the hinge pin 48 is eccentric relative to the respective axes A1 and A2 of the pieces 50 and 52.

Figure 5:
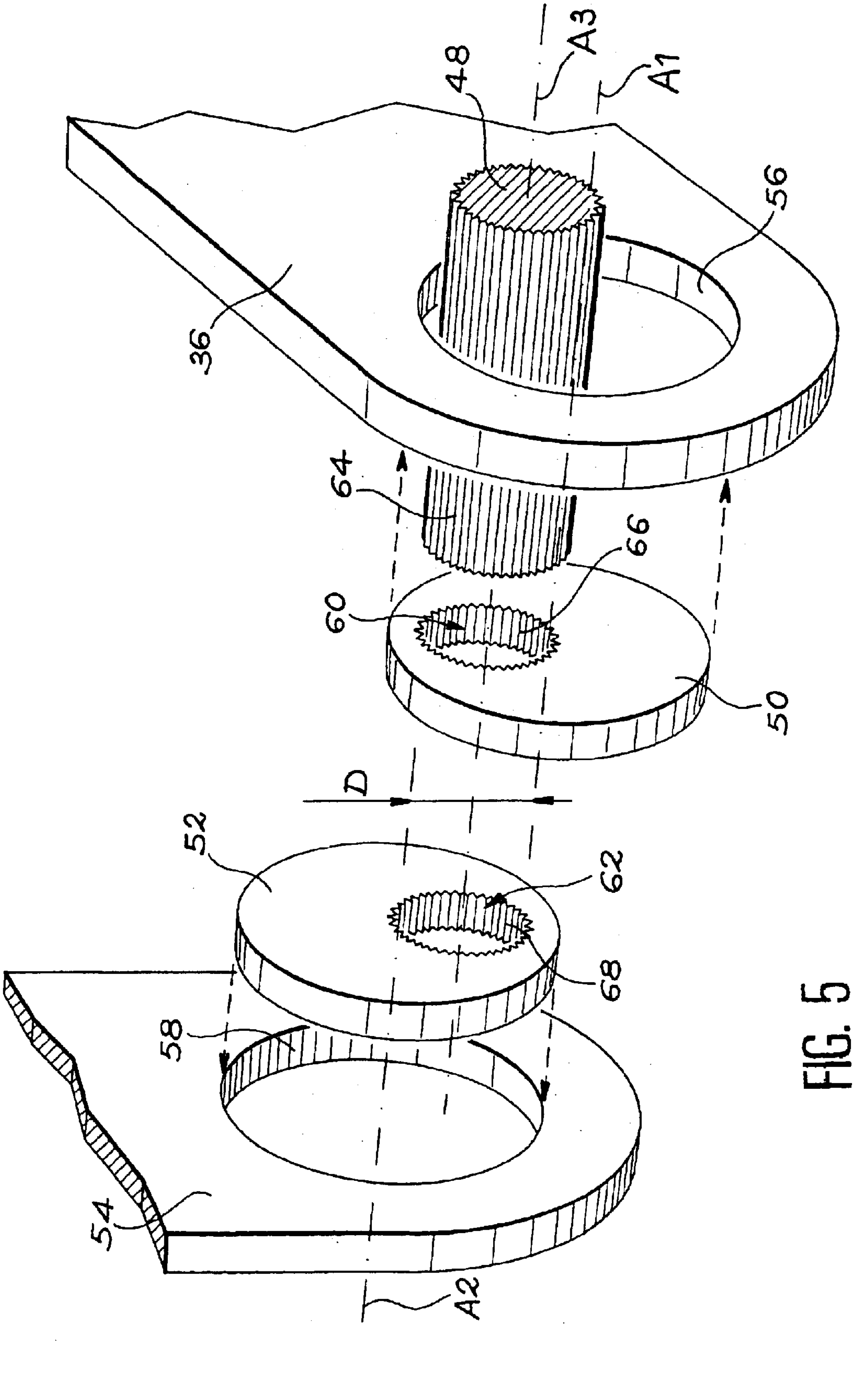
FIG. 5 is an exploded perspective view which illustrates a second embodiment of the rear fastener according to the present invention.

The abovedescribed arrangement with reference to FIG. 5 effectively reduces the height of the joining elements of the rear fastener 24 which connect the wing body assembly and the rigid structure of the strut, relative to the first embodiment described. As a consequence, for a distance between the strut and the underside of the wing body assembly substantially identical to that of this first embodiment, it is not necessary to arrange recesses in the wing body assembly for accommodating the joining elements.

Preferably and as illustrated diagrammatically in FIG. 5, anti-rotation means are provided between the hinge pin 48 and each of the pieces 50 and 52 in the form of a disc. These anti-rotation means comprise, for example, toothing or serrations 64 formed on the peripheral surface of the hinge pin 48, engaged on complementary toothing or serrations 66 and 68 formed respectively in the cylindrical holes 60 and 52.

The latter arrangement effectively eliminates degree of freedom in the resulting linkage between the strut and the support 54 fixed under the wing body assembly.

FIG. 6 illustrates a variant of the second embodiment of the invention, in which each of the two rear braces 36 of the rear fastener 24 has the form of a V-shaped cap. More precisely, the brace 36 illustrated in FIG. 6 comprises two flat plates 70, parallel to one another. In this case, a cylindrical hole 56 is machined in each of the plates 70, such that the two holes 56 are centred on the same axis A1.

Each of the cylindrical holes 56 receives a piece 50 in the form of a disc, traversed by a cylindrical hole 60 whereof the diameter is the same as that of the hinge pin 48.

In this case, the foot realising the support 54 is placed between the parallel plates 70 of the rear brace 36, with the piece in the form of a disc 52 being received pivotably in the cylindrical hole 58, as in the embodiment in FIG. 5.

The hinge pin 48 then passes simultaneously through each of the cylindrical holes 60 and 62 formed respectively in the two pieces in the form of a disc 50 and in the piece in the form of a disc 52. The hinge pin 48 thus ensures linkage between the rear brace 36 of the strut 10 and the support 54. The cohesion of this linkage can be ensured especially by end shields, nuts, etc. placed at the ends of the hinge pin 48.

As in the mode in FIG. 5, anti-rotation means such as serrations can be provided between the hinge pin 48 and the cylindrical holes 60 and 62 in which this axis is accommodated. In this way a degree of freedom in the linkage provided between the strut 10 and the support 54 fixed under the wing body assembly is eliminated.

Figure 7:
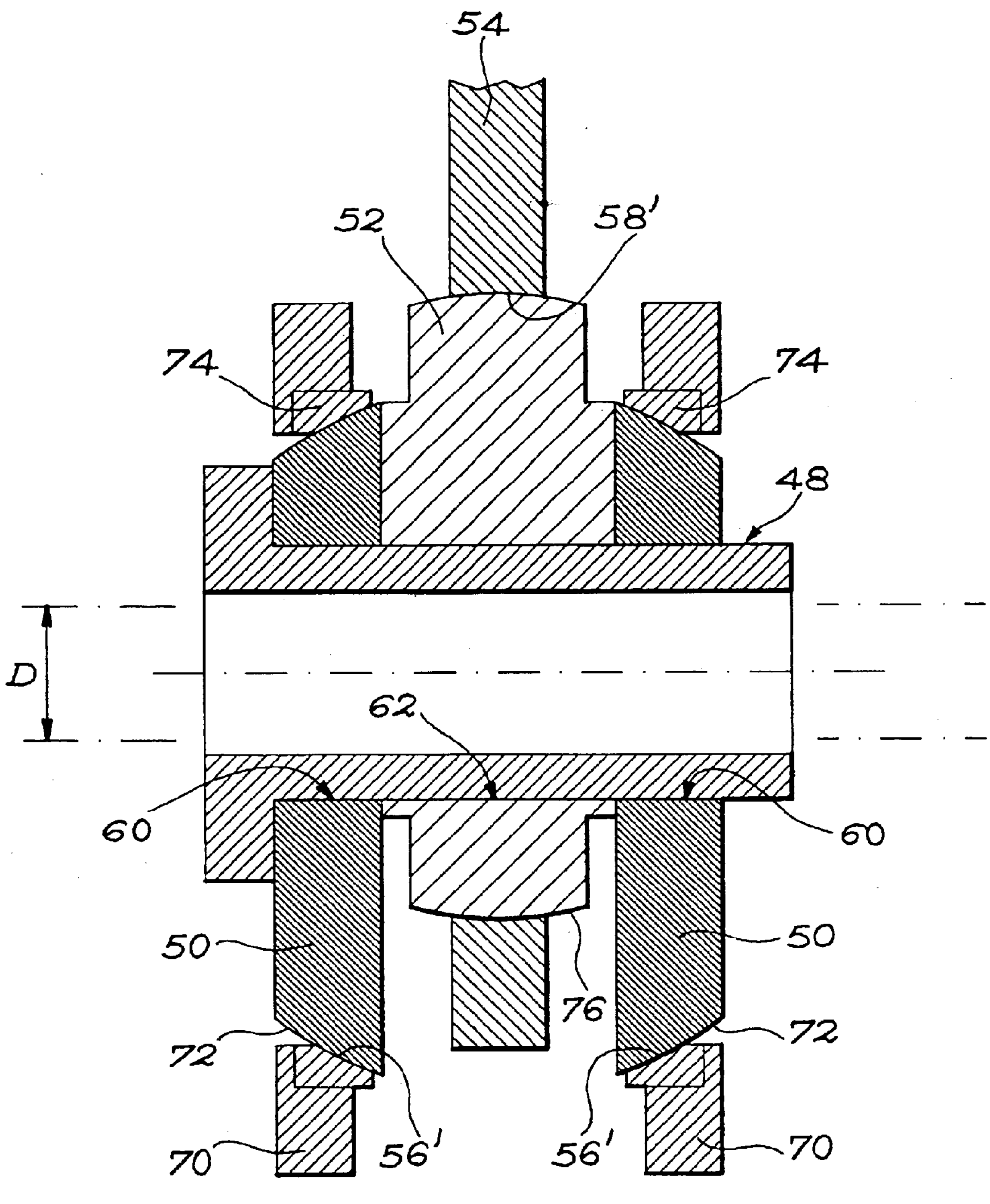
FIG. 7 is a sectional view which illustrates a variant of the refinement illustrated in FIG. 6.

FIG. 7 shows a refinement to the variant embodiment described hereinabove with reference to FIG. 6.

In this case, a pot-type joint function is added to each of the joining elements by which each of the rear braces 36 is connected to the structural part of the wing body assembly.

More precisely, each of the pieces in the form of a disc 50 mounted in the plates 70 of the rear brace 36 exhibits a peripheral surface 72 in the form of a segment of a sphere. Intermediate pieces 74, forming cages of pot-type joint are mounted in each of the plates 70, for the purpose of defining internal surfaces 56' in the form of a segment of a sphere. These internal surfaces are complementary to the peripheral surfaces 72 of the pieces in the form of a disc 50 and have a common centre of rotation. In this way, when the pieces in the form of a disc 50 are taken up in the intermediate pieces 74, they ensure linkage of pot-type joint between the pivot axis 48 and the rear brace 36.

By way of comparison, the piece in the form of a disc 52 has an external peripheral surface 76 in the form of a segment of a sphere, complementary to an internal surface 58', in the form of a segment of a sphere, of the support 54. Thus, when the piece in the form of a disc 52 is taken up in the support 54 the complementary surfaces 76 and 58' connect the pivot axis and the support 54 via a linkage of pot-type joint.

As has been shown in FIG. 7, the two linkages of pot-type joint thus formed have centres which are offset by a distance D relative to one another in a vertical direction. This distance D is the same as in the embodiment in FIG. 5 described hereinabove. It can be adjusted to allow installation of the support 54 integrally under the wing body assembly of the aircraft.

In the refinement which has just been described in reference to FIG. 7, only a degree of freedom of the joining elements of the rear fasteners is fixed. In addition, the greatest compactness of the second embodiment of the invention, relative to the first, is likewise accompanied by a reduction in weight.

It should be noted that the embodiments which have just been described by way of example relate to hooking a strut under a wing body assembly having a certain type of structural architecture. All the same, the invention is not limited to this type of wing body assembly and can also be utilised on aircraft of which the wing body assembly has a structural architecture of a different type. In this case, the joining elements form the rear fastener and the shearing pion 42 can cooperate with a different structural part of the wing body assembly.

What is claimed is:

1. A strut for hooking an engine under a wing body assembly a rigid structure comprising: a rigid structure comprising a rear part having a width which increases substantially and a depth which decreases substantially, as it progresses to the rear; and means of hooking said rigid structure under the wing body assembly, said hooking means comprising rear fastener, a rear fastener and means for absorbing forces, said rear fastener comprising two rear braces fixed to the rigid structure, so as to protrude laterally on both sides of the latter, in a rear region of said rear part, and at least two joining elements connecting each one of said rear braces to a structural part of the wing body assembly.

2. The strut as claimed in claim 1, in which each of said joining elements comprises a first binge pin, a shackle passing through a lower wing surface covering of the wing body assembly and a second hinge pin parallel to the first, the first hinge pin connecting one of the rear braces to an inner end of the shackle and the second hinge pin connecting an upper end of the shackle to said structural part of the wing body assembly.

3. The strut as claimed in claim 2, in which the first hinge pin and the second hinge pin are oriented according to a longitudinal direction of the engine.

4. The strut as claimed in claim 1, in which each of said joining elements comprises a hinge pin, at least a first piece mounted in one of the rear braces so as to be able to pivot about a first axis and a second piece mounted in a support fixed to the structural part of the wing body assembly, under a lower wing surface covering of the latter, so as to be able to pivot about a second axis, the hinge pin passing through the first piece and the second piece, the first axis and the second axis being parallel to one another, offset vertically relative to one another and oriented in a longitudinal direction of the engine.

5. The strut as claimed in claim 4, in which anti-rotation means are provided between the hinge pin and each of the first and second pieces, so as to prohibit any relative rotation between them.

6. The strut as claimed in claim 4, in which each of the rear braces is in the form of a U-shaped cap comprising two parallel plates between which is placed said support, a first piece being mounted in each of the plates of the rear brace.

7. The strut as claimed in claim 6, in which two first pieces are mounted respectively in each of the two plates of each rear brace, said first pieces cooperating with the two plates 70 of the rear brace by surfaces in the form of a segment of a sphere defining between the plates and said pieces a linkage of a pot-type joint.

8. The strut as claimed in claim 7, in which intermediate pieces forming pot-type joint cages are fixed in each of the two plates of the rear brace and cooperate via internal surfaces in the form of a segment of a sphere with external surfaces in the form of a segment of a sphere of the first pieces.

9. The strut as claimed in claim 1, in which the joining elements comprise an external joining element and an internal joining element relative to the aircraft and the external joining element is closer to a vertical plane passing through a longitudinal axis of the engine than the internal joining element.

10. The strut as claimed in claim 1, in which said means for absorbing forces comprise a pot-type joint fixed at the rear part of the rigid structure, between the two rear braces, and a shearing pion fixed to the wing body assembly and traversing said pot-type joint.

11. The strut as claimed in claim 10, in which the shearing pion is fixed to said structural part of the wing body assembly and located in a vertical plane passing through a longitudinal axis of the engine.

12. The strut as claimed in claim 1, in which the front fastener comprises a front brace fixed to a front region of said rear part, and a mounting axis of said front brace on the wing body assembly, said mounting axle being oriented in a longitudinal direction.

13. The strut as claimed in claim 12, in which the mounting axle is fixed to a front longeron of the wing body assembly.

* * * * *